Nov. 6, 1945.   T. A. COHEN   2,388,387
SYSTEM FOR MEASURING THE TIME INTERVAL FOR MOVING
BODIES TO TRAVERSE PREDETERMINED DISTANCES
Filed Feb. 26, 1943
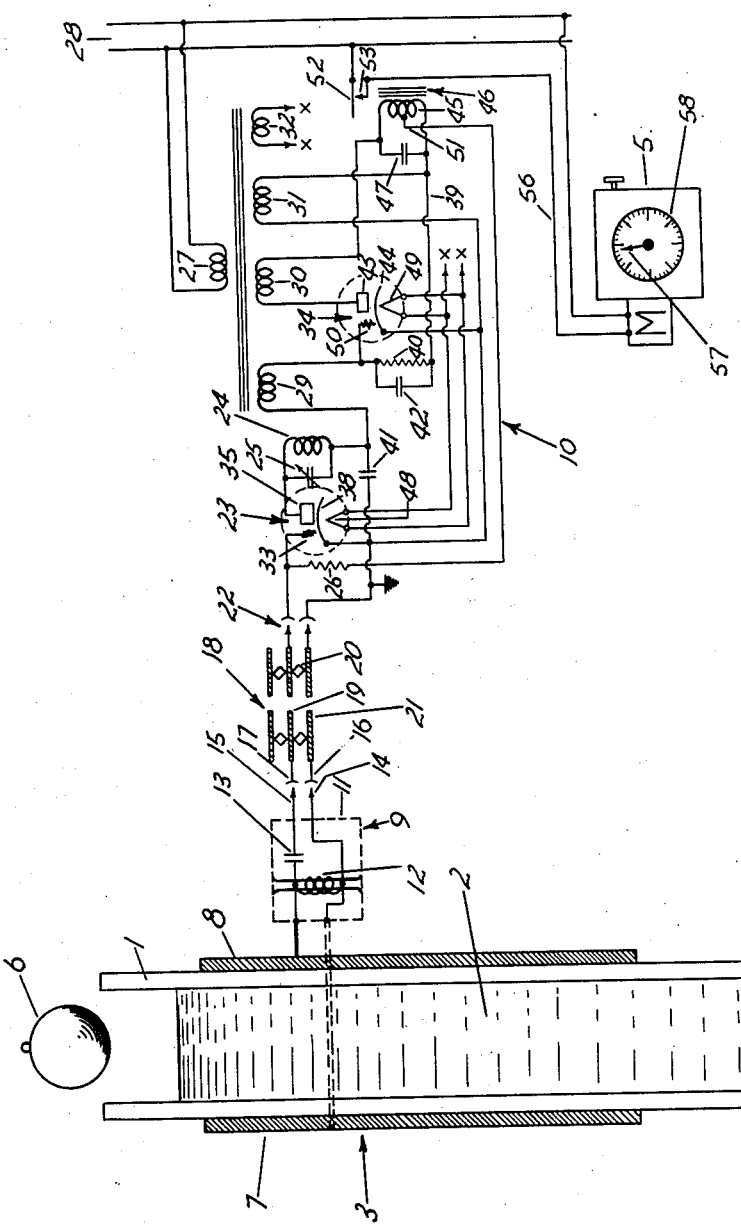
Theodore A. Cohen, INVENTOR,
BY Theodore W. Miller,
Attorney

UNITED STATES PATENT OFFICE 2,388,387

SYSTEM FOR MEASURING THE TIME INTERVAL FOR MOVING BODIES TO TRAVERSE PREDETERMINED DISTANCES

Theodore A. Cohen, Chicago, Ill., assignor, by mesne assignments, to Wheelco Instruments Company, Chicago, Ill., a corporation of Illinois Application February 26, 1943, Serial No. 477,291

1 Claim. (Cl. 161—18)

This invention relates to measuring apparatus in general and more particularly to a system for measuring the time interval for a moving body to traverse a predetermined distance, especially applicable in measuring the viscosity of a liquid and has for its primary object the provision of an efficient and accurate apparatus for that purpose.

Other and further objects of this invention will become more apparent hereinafter as the same becomes better understood from an examination of the specification and drawing hereinafter referred to wherein there is shown in the single figure a schematic and diagramatic view of an apparatus embodying this invention.

Referring to the drawing more particularly, reference character 1 designates a vertical narrow container for a liquid 2, the viscosity of which is to be measured.

An impedance change device 3 is mounted upon container 1, intermediate the upper and lower ends thereof, and comprises a pair of elongated metal plates 7 and 8 shaped to fit laterally spaced positions on said container. The plates 7 and 8 act as plates of a condenser, the capacity of which is changed as a ball 6 passes therebetween. The plates 7 and 8 are so connected to apparatus, to be hereinafter described as to start and stop, respectively, a timing device 5 so that the time consumed by the ball 6 in passing through the liquid 2 within the impedance change device 3 from the upper to the lower ends of plates 7 and 8 will be a measure of the viscosity of said liquid and said viscosity will be shown directly upon the timing device 5.

The plates 7 and 8 are connected to a self contained grid tank unit 9 for an oscillator circuit 10. This unit 9 is mounted in a suitable housing 11 and comprises an inductance coil 12 and condenser 13 and together with the plates 7 and 8 forms a resonating circuit with said plates connected to opposite ends of said coil and said condenser connected to one end of said coil. A pair of male plugs 14 and 15 are connected to one end of said coil 12 and to the condenser 13, respectively.

The male plugs 14 and 15 are adapted to connect with female connector elements 16 and 17, respectively, at one end of a concentric conductor cable insulated from ground by an external rubber sheath of cover (not shown). The cable 18 comprises an inner conductor 19, separators 20 and an outer conducting sheath 21. The end of the cable opposite to the connector 14—17 is provided with a connector 22 similar thereto for connection to the input of the oscillator circuit 10 hereinafter described.

The concentric co-axial conductor cable 18 is constructed in well known manner with its core conductor fixedly and concentrically positioned within the conducting sheath. By properly choosing the values of the capacitive and inductive components of the resonating circuit in enclosure 9, the cable is properly terminated so that minimum power losses are obtained in the system due to the cable for any substantial length thereof. In this manner the remote control assembly just described may control the oscillator apparatus 10 hereinafter described, without fear of transmission losses which otherwise would reduce the sensitivity of the apparatus.

The oscillator circuit includes a vacuum tube 23 connected to a plate tank comprising an inductance 24, variable condenser 25 for tuning to resonance, as will be hereinafter described, and grid bias resistor or grid leak 26 for said tube.

Alternating current voltages are obtained from a multi-winding transformer having a primary winding 27, connected to a suitable source of alternating current such as line 28 and having a plurality of secondary windings 29, 30, 31 and 32 arranged to supply suitable voltages to the tube circuits. The tube 23 and repeater tube 34, hereinafter described, are self rectifying and therefore the operation will be described only with respect to the positive half cycles of the alternating current voltages.

The output circuit for the tube 23 may be traced from the left-hand terminal of the secondary winding 29 through the plate tank circuit 24, 25, the anode or plate 35, the cathode 38, the secondary winding 31, the conductor 39, a load impedance or resistor 40 and thence to the right hand terminal of secondary winding 29. Bypass condensers 41 and 42 are connected as shown and prevent the flow of high frequency and oscillatory currents through the transformer windings and through the load impedance 40. The total voltage impressed across the anode circuit of the tube 23 is the sum of the voltages of the secondary windings 29 and 31.

The output circuit for the repeater or amplifier tube 34 may be traced from the left-hand terminal of the secondary winding 30 to the anode or plate 43, the cathode 44, the secondary winding 31, the voltage of which is in phase with the voltage of the winding 30, the operating winding 45 of the relay 46 and to the right hand terminal of the winding 30. A condenser 47 is connected as shown across the relay winding 45 and prevents chatter of the relay by supplying energy to it during the negative or non-conducting portion of an A. C. cycle. Transformer secondary winding 32 is connected to filaments 48 and 49 to heat cathodes 38 and 44, respectively, by wires x—x not completed. The grid bias for effecting proper operation of the repeater tube 34 is obtained by connecting the grid or control electrode 50 to one end of the load resistor 40, the remaining portion of this circuit extending from the cathode 44 to the secondary transformer winding 31, and the conductor 39 to the opposite end of the load resistor 40. It will be apparent that the voltage across the winding 31 is opposite to and thus compensates for a portion of the voltage drop across the load impedance 40 and accordingly when the oscillator tube 23 is in oscillatory condition so that a plate current of low value flows through the load impedance 40, a minimum negative bias equal to the difference between the voltage of the winding 31 and the voltage drop across the load impedance 40 is impressed on the grid 50. Under these conditions, and with proper voltages, the tube constants, and the value of the load resistance, all so prechosen as to provide a low negative grid bias, a high repeater plate current is obtained for proper operation of the relay.

A regenerative coupling is provided between the grid circuit of the tube 23 and the output of the repeater tube 34, as shown. The grid circuit for the oscillator tube 23 extends from the cathode 38, the transformer winding 31, the lower end of relay winding 45, the tap 51 and the grid bias resistor or grid leak 26 to the grid 33.

A fixed grid bias is applied, by the above circuit, to the grid 33 which is equal to the voltage drop across the relay winding 45 to tap 51 and is so chosen that with maximum current flowing in the output circuit of the amplifier or repeater tube 34 the maximum desired negative bias is applied to the grid 33.

The plate tank is tuned to predetermined resonance with condenser 25 so as to energize relay 46 when the ball 6 enters the upper end of the plates 7—8 of the pick-up device 3. Since the plates 7 and 8 are perfectly symmetrical throughout their length the impedance change will be the same until the ball 6 leaves the lower ends of the plates 7 and 8 and the relay 46 will remain energized throughout that predetermined travel of said ball through the liquid 2.

When the relay 46 is energized the contacts 52 and 53 are closed to start the operation of the timing device 5 as will be hereinafter described. When the ball is within the impedance change device or clip 3 between the plates 7 and 8 the oscillator circuit is tuned and the oscillator plate current drops, decreasing the drop across resistor 40, which decreases the negative bias on the amplifier tube 34; the plate current of the amplifier increases, increasing the drop across the relay 46, which increases the negative bias on the grid of the oscillator 23, aiding in dropping the oscillator plate current, which further tends to decrease the bias upon the amplifier 34, etc., with the result that the final magnitude of the plate current of amplifier 34 is at saturation. By the judicious choosing of load resistance 40, of the resistance of the relay winding 45 and the proper apportioning of bias voltages as shown, the values of plate current between cut-off and saturation may be fixed at any desired value. The result is that large, abrupt, and rapid plate current changes are always obtained. The result obtainable is comparable to the triggering off of a "Thyratron" type hot cathode grid control rectifier without the necessity of using gas filled tubes.

Study of the circuit arrangement will also bring out that the system is self compensating for changes in line voltage which prevents shifting of the control point if the line voltage should change.

It is not necessary that the apparatus be limited to the use of separate vacuum tubes, each containing separate triode elements, since these separate tubes have been chosen only as a matter of convenience. Dual purpose tubes having triode elements in a common envelope may be operated in the same manner. Direct current voltages may also be used.

It will be noted that the plate supply for tubes 23 and 34 is obtained from winding 29 and 30, respectively, in series with 31. Should the line voltage fall the supply voltage from 30 would reduce and therefore the plate current flow in the plate circuit of tube 34 would tend to decrease. However, since winding 29 supplies the plate circuit of tube 23 and since the negative bias on grid 50 is obtained from the drop across resistor 40 due to plate current flow in plate circuit of tube 23, the plate current of tube 23 is also reduced with reduction of voltage from 29. Therefore the negative bias on grid 50 is reduced keeping the plate current flow in the plate circuit of tube 34 substantially constant. The reverse result is obtained with rise in line voltage. This self compensating feature is important in electronic control apparatus since it prevents shift of the control point or level upon changes in line voltage. Ageing of tubes is also compensated for in the same manner in conjunction with the regenerative connection between tap 51 and resistor 26.

In summary, the advantages of this circuit are manifest inasmuch as a relay with a high throw-out percentage is not necessary, since the plate current changes through said relay are very rapid and very large. It is impossible to lose control of the oscillator, since, because of the fact that it is self-rectified, oscillations, no matter how minute, will always reoccur. Other modifications of this circuit will readily occur to those versed in the art, such as the use of a common power supply, with a self-rectified circuit, instead of separate voltages as shown. Such circuits have been designed and are entirely feasible. The one shown being of a family of such circuits and being chosen as the most descriptive of the above-explained operation.

When the ball 6 has passed the impedance change device 3, the oscillator circuit is detuned, causing its plate current to rise sharply, increasing the voltage drop across the resistor 40, which correspondingly increases the negative bias upon the amplifier tube 34 with a consequent drop in its plate current through the relay 46. The decrease in current through the relay 46 causes a decrease in the negative grid bias applied to the grid of the oscillator tube 23, which tends to further increase the plate current of the oscillator tube 23. This increase in the oscillator plate current further increases the voltage drop across the load resistor 40 and the negative bias upon the amplifier tube 34 with the consequent effect of rapidly dropping the amplifier plate current level to the cut-off point, which causes approximately zero level in the plate current and deenergizing of the relay to open contacts 52 and 53 and stop motor M and the timing device 5.

The relay contacts 52 and 53, controlled by relay 46 and the impedance change device 3, are in circuit with a conductor 56 leading from one side of line 28 to motor M and thence to the other side of the line whereby said motor is energized when said contacts are closed upon the energization of said relay.

The amount that the timing device 5 has been actuated during the travel of the ball 6 from the upper to the lower ends of plates 7 and 8 will be a measure of the viscosity and said device 5 may be calibrated so that the indicator 57 thereon may directly indicate the viscosity on a scale 58.

The clock 5 is provided with the usual reset knob 65 and attendant mechanism (not shown) for resetting the indicator 57 to any predetermined initial position.

I claim:

A system for measuring the time interval for a moving body to traverse a predetermined distance, comprising a pair of opposed spaced parallel capacitive members defining a path therebetween of predetermined length along which the body may move, electronic means affected in one way by the capacitance change incident upon the entry of said body into said path between said members and affected in another way by the capacitance change incident upon said body leaving said path and making its exit from between said capacitive members, said electronic means when so affected being operative to start and stop a timing device, and a timing device controlled by said electronic means to measure the time consumed by said body in traveling said path.

THEODORE A. COHEN.